(12) United States Patent
Ko

(10) Patent No.: US 12,292,553 B2
(45) Date of Patent: ***May 6, 2025

(54) CONVERTER OPTICAL SYSTEM

(71) Applicant: Samsung Electro-Mechanics Co., Ltd., Suwon-si (KR)

(72) Inventor: Jung Hui Ko, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 33 days.

This patent is subject to a terminal disclaimer.

(21) Appl. No.: 17/678,289

(22) Filed: Feb. 23, 2022

(65) Prior Publication Data

US 2022/0171170 A1    Jun. 2, 2022

Related U.S. Application Data

(63) Continuation of application No. 16/819,859, filed on Mar. 16, 2020, now Pat. No. 11,287,619, which is a
(Continued)

(30) Foreign Application Priority Data

Jan. 27, 2016    (KR) .................... 10-2016-0009794

(51) Int. Cl.
*G02B 15/12* (2006.01)
*G02B 13/00* (2006.01)

(52) U.S. Cl.
CPC ............ *G02B 15/12* (2013.01); *G02B 13/001* (2013.01)

(58) Field of Classification Search
CPC ...... G02B 15/02; G02B 15/12; G02B 13/001; G02B 13/0045; G02B 13/18; G02B 13/02; G02B 9/60
(Continued)

(56) References Cited

U.S. PATENT DOCUMENTS 4,173,396 A    11/1979 Yokota
4,451,125 A    5/1984 Sato
(Continued)

FOREIGN PATENT DOCUMENTS

CN    202794683 U    3/2013
CN    104062744 A    9/2014
(Continued)

OTHER PUBLICATIONS

Korean Office Action issued on Feb. 20, 2017, in counterpart Korean Application No. 10-2016-0009794 (9 pages in English and 6 pages in Korean).
(Continued)

*Primary Examiner* — Jie Lei
(74) *Attorney, Agent, or Firm* — NSIP Law

(57) ABSTRACT

A converter optical system includes a first lens having positive refractive power; a second lens having negative refractive power; a third lens having positive refractive power; a fourth lens having negative refractive power; and a fifth lens having positive refractive power; wherein the first to fifth lenses are sequentially disposed in numerical order from the first lens to the fifth lens from an object side of the converter optical system to an image side of the converter optical system; and the fourth lens is bonded to either one or both of the third lens and the fifth lens.

15 Claims, 13 Drawing Sheets

Related U.S. Application Data continuation of application No. 15/392,149, filed on Dec. 28, 2016, now Pat. No. 10,627,608.

(58) Field of Classification Search
USPC ............... 359/714, 764, 753, 746, 673, 766
See application file for complete search history.

(56) References Cited

U.S. PATENT DOCUMENTS

| | | | |
|---|---|---|---|
| 5,636,067 A * | 6/1997 | Shimizu | G02B 9/34 |
| | | | 359/716 |
| 5,657,170 A | 8/1997 | Yahagi et al. | |
| 7,133,220 B2 * | 11/2006 | Nishina | G02B 9/34 |
| | | | 359/768 |
| 8,456,758 B1 * | 6/2013 | Huang | G02B 13/0045 |
| | | | 359/764 |
| 8,780,466 B2 | 7/2014 | Hsieh et al. | |
| 10,151,900 B2 | 12/2018 | Lin et al. | |
| 10,627,608 B2 | 4/2020 | Ko | |
| 11,287,619 B2 * | 3/2022 | Ko | G02B 15/12 |
| 2001/0033426 A1 | 10/2001 | Nakazawa et al. | |
| 2013/0208178 A1 | 8/2013 | Park | |
| 2013/0258499 A1 | 10/2013 | Hashimoto | |
| 2013/0286486 A1 | 10/2013 | Hsieh et al. | |
| 2014/0168500 A1 | 6/2014 | Chen | |
| 2014/0285907 A1 | 9/2014 | Tang et al. | |
| 2015/0185442 A1 * | 7/2015 | Katsuragi | G02B 9/60 |
| | | | 348/360 |
| 2015/0205188 A1 | 7/2015 | Ogata | |
| 2016/0349488 A1 * | 12/2016 | Liu | G02B 13/0045 |
| 2017/0146811 A1 * | 5/2017 | Son | G02B 7/08 |
| 2017/0212336 A1 | 7/2017 | Ko | |

FOREIGN PATENT DOCUMENTS

| | | |
|---|---|---|
| CN | 206710684 U | 12/2017 |
| GB | 2 253 494 B | 2/1994 |
| JP | 6-324263 A | 11/1994 |
| JP | 3429599 B2 | 7/2003 |
| JP | 2008-250331 A | 10/2008 |
| JP | 2015-52674 A | 3/2015 |
| KR | 10-0850469 B1 | 8/2008 |
| KR | 10-2013-0092846 A | 8/2013 |

OTHER PUBLICATIONS

Korean Office Action issued on Aug. 31, 2017, in counterpart Korean Application No. 10-2016-0009794 (7 pages in English and 5 pages in Korean).

Chinese Office Action issued on Nov. 1, 2018, in counterpart Chinese Application No. 201710006998.X (10 pages in English and 9 pages in Chinese).

Chinese Office Action issued on Jan. 7, 2022, in counterpart Chinese Patent Application No. 202110061042.6 (16 pages in English and 12 pages in Chinese).

* cited by examiner

| FIRST EXAMPLE | | | | |
|---|---|---|---|---|
| F number = 1.95 | | f = 48328.0 | D = | 40.0000 |
| SURFACE NO. | | RADIUS OF CURVATURE | THICKNESS /DISTANCE | REFRACTIVE INDEX | ABBE NUMBER |
| S1 | FIRST LENS | 24.2920 | 9.0000 | 1.589 | 61.3 |
| S2 | | 51.1220 | 10.3300 | | |
| S3 | SECOND LENS | 16.1770 | 5.8000 | 1.650 | 21.5 |
| S4 | | 9.9430 | 1.1300 | | |
| S5 | THIRD LENS | 11.4670 | 6.0000 | 1.644 | 31.8 |
| S6 | | -80.5790 | 0.0000 | | |
| S7 | FOURTH LENS | -80.5790 | 2.0000 | 2.001 | 29.1 |
| S8 | | 4.7440 | 0.1000 | | |
| S9 | FIFTH LENS | 4.5370 | 5.6400 | 1.544 | 56.1 |
| S10 | | 212.885 | | | |

FIG. 3

| SURFACE NO. | K | A | B | C | D | E | F |
|---|---|---|---|---|---|---|---|
| 3 | -2.25208 | -2.48390E-04 | 1.96901E-06 | -1.53829E-08 | 9.15806E-11 | -3.21757E-13 | 4.81418E-16 |
| 4 | -7.48956 | -1.37561E-04 | 2.93170E-08 | 3.96954E-09 | -1.66658E-12 | -2.20954E-13 | 9.38691E-16 |
| 9 | 0 | -7.90279E-04 | 9.00250E-05 | -9.59181E-06 | 4.91183E-07 | -1.11378E-08 | -4.53665E-11 |
| 10 | 0 | 1.91381E-03 | -5.30216E-04 | 7.23598E-05 | 2.48873E-07 | -1.09221E-06 | 8.47832E-08 |

FIG. 4

| SECOND EXAMPLE | | | | |
|---|---|---|---|---|
| F number = 1.93 | | f = 47047.3 | D = | 30.9100 |
| SURFACE NO. | RADIUS OF CURVATURE | THICKNESS /DISTANCE | REFRACTIVE INDEX | ABBE NUMBER |
| S1 | 19.4360 | 9.0000 | 1.589 | 61.3 |
| FIRST LENS | | | | |
| S2 | 62.7800 | 2.9500 | | |
| S3 | 13.3210 | 4.6000 | 1.650 | 21.5 |
| SECOND LENS | | | | |
| S4 | 7.8540 | 5.1200 | | |
| S5 | 13.4930 | 6.0000 | 1.785 | 25.7 |
| THIRD LENS | | | | |
| S6 | -14.5630 | 0.0000 | | |
| S7 | -14.8480 | 1.0200 | 2.001 | 29.1 |
| FOURTH LENS | | | | |
| S8 | 4.3080 | 0.1000 | | |
| S9 | 4.5000 | 2.1200 | 1.544 | 56.1 |
| FIFTH LENS | | | | |
| S10 | -37.035 | | | |

FIG. 7

| SURFACE NO. | K | A | B | C | D | E | F |
|---|---|---|---|---|---|---|---|
| 3 | -7.78749 | -7.22350E-05 | 1.24793E-07 | 3.16962E-09 | -1.57856E-11 | -2.90292E-13 | 1.96157E-15 |
| 4 | -7.78749 | -7.22351E-05 | 1.24793E-07 | 3.16962E-09 | -1.57856E-11 | -2.90292E-13 | 1.96157E-15 |
| 9 | 0.10504 | -1.27352E-04 | 1.72238E-04 | -3.16259E-06 | -1.08318E-06 | -5.11507E-08 | 8.97837E-09 |
| 10 | -106.7530 | 1.06558E-03 | -7.98888E-05 | -8.23579E-06 | 3.16347E-07 | 9.49308E-08 | -4.21477E-09 |

FIG. 8

| THIRD EXAMPLE | | | | |
|---|---|---|---|---|
| F number = 1.94 | f = | 47120.4 | D = | 26.9700 |
| SURFACE NO. | RADIUS OF CURVATURE | THICKNESS /DISTANCE | REFRACTIVE INDEX | ABBE NUMBER |
| S1 FIRST LENS | 16.2850 | 9.0000 | 1.589 | 61.3 |
| S2 | 52.3320 | 1.4400 | | |
| S3 SECOND LENS | 15.1990 | 4.6000 | 1.650 | 21.5 |
| S4 | 8.0950 | 3.1800 | | |
| S5 THIRD LENS | 12.9260 | 6.0000 | 1.785 | 25.7 |
| S6 | -14.1180 | 0.0000 | | |
| S7 FOURTH LENS | -14.0560 | 0.3000 | 2.001 | 29.1 |
| S8 | 3.9170 | 0.0300 | | |
| S9 FIFTH LENS | 3.8960 | 2.4200 | 1.581 | 40.9 |
| S10 | -132.438 | | | |

FIG. 11

| SURFACE NO. | K | A | B | C | D | E | F |
|---|---|---|---|---|---|---|---|
| 3 | -9.40646 | -2.02998E-04 | 1.98824E-06 | -1.55448E-08 | 9.02055E-11 | -3.23021E-13 | 5.11264E-16 |
| 4 | -6.91851 | -8.82140E-05 | -1.07757E-10 | 1.87875E-09 | -8.33927E-12 | -1.74468E-13 | 1.45071E-15 |

FIG. 12

CONVERTER OPTICAL SYSTEM

CROSS-REFERENCE TO RELATED APPLICATIONS

This application is a continuation of U.S. application Ser. No. 16/819,859 filed on Mar. 16, 2020, now U.S. Pat. No. 11,287,619 issued on Mar. 29, 2022, which is a continuation of U.S. application Ser. No. 15/392,149 filed on Dec. 28, 2016, now U.S. Pat. No. 10,627,608 issued on Apr. 21, 2020, which claims the benefit under 35 USC 119 (a) of Korean Patent Application No. 10-2016-0009794 filed on Jan. 27, 2016, in the Korean Intellectual Property Office, the entire disclosures of which are incorporated herein by reference for all purposes.

BACKGROUND

1. Field

This application relates to a converter optical system.

2. Description of Related Art

A small camera module mounted in a portable terminal is very small. The small camera module has a fixed focus, and may thus image only a subject positioned at a short distance therefrom. Some small camera modules may image a subject positioned at a far distance therefrom through a digital zoom function or an optical zoom function. However, the digital zoom function has a very low level of resolution, and the optical zoom function has a difficulty in obtaining a desired zoom ratio due to a limitation of sizes of portable terminals.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a converter optical system includes a first lens having positive refractive power; a second lens having negative refractive power; a third lens having positive refractive power; a fourth lens having negative refractive power; and a fifth lens having positive refractive power; wherein the first to fifth lenses are sequentially disposed in numerical order from the first lens to the fifth lens from an object side of the converter optical system to an image side of the converter optical system; and the fourth lens is bonded to either one or both of the third lens and the fifth lens.

The converter optical system may have a magnification of two times or more.

An expression 26<D<45 mm may be satisfied, where D is a distance from an object-side surface of the first lens to an image-side surface of the fifth lens.

An expression $1.55<n1<1.65$ may be satisfied, where n1 is a refractive index of the first lens.

An expression f number <2.0 may be satisfied, where f number is an f number of the converter optical system.

An object-side surface of the first lens may be convex.
An image-side surface of the first lens may be concave.
An object-side surface of the second lens may be convex.
An image-side surface of the second lens may be concave.
Both an object-side surface and an image-side surface of the fourth lens may be concave.

An object-side surface of the fifth lens may be convex.

In another general aspect, a converter optical system includes a first lens having positive refractive power; a second lens having refractive power; a third lens having a convex object-side surface and a convex image-side surface; a fourth lens having a concave object-side surface and a concave image-side surface; and a fifth lens having refractive power; wherein the first to fifth lenses are sequentially disposed in numerical order from the first lens to the fifth lens from an object side of the converter optical system to an image side of the converter optical system; and the image-side surface of the third lens is bonded to the object-side surface of the fourth lens.

The first to fifth lenses may be plastic lenses.

An expression 1000<f/D may be satisfied, where f is an overall focal length of the converter optical system, and D is a distance from an object-side surface of the first lens to an image-side surface of the fifth lens.

Absolute values of effective radii of the first to fifth lenses may decrease as a distance of a lens from the object side of the converter optical system increases so that an expression |r1|>|r2|>|r3|>|r4|>|r5| is satisfied, where r1 is the effective radius of the first lens, r2 is the effective radius of the second lens, r3 is the effective radius of the third lens, r4 is the effective radius of the fourth lens, and r5 is the effective radius of the fifth lens.

In another general aspect, a converter optical system includes a first lens having positive refractive power; a second lens having negative refractive power; a third lens having positive refractive power; a fourth lens having negative refractive power; and a fifth lens having positive refractive power; wherein the first to fifth lenses are sequentially disposed in numerical order from the first lens to the fifth lens from an object side of the converter optical system to an image side of the converter optical system; and any one or any combination of any two or more of the following expressions are satisfied: 26<D<45 mm, $1.55<n1<1.65$, f number <2.0, and 1000<f/D, where D is a distance from an object-side surface of the first lens to an image-side surface of the fifth lens, n1 is a refractive index of the first lens, f number is an f number of the converter optical system, and f is an overall focal length of the converter optical system.

Absolute values of effective radii of the first to fifth lenses may decrease as a distance of a lens from the object side of the converter optical system increases so that an expression |r1|>|r2|>|r3|>|r4|>|r5| is satisfied, where r1 is the effective radius of the first lens, r2 is the effective radius of the second lens, r3 is the effective radius of the third lens, r4 is the effective radius of the fourth lens, and r5 is the effective radius of the fifth lens.

An image-side surface of the first lens may be concave.
An object-side surface of the fourth lens may be concave.
An image-side surface of the fifth lens may be convex.
Other features and aspects will be apparent from the following detailed description, the drawings, and the claims.

BRIEF DESCRIPTION OF DRAWINGS

FIG. 3 is a table listing examples of characteristics of lenses of the converter optical system illustrated in FIG. 1.

FIG. 4 is a table listing examples of aspherical characteristics of the converter optical system illustrated in FIG. 1.

FIG. 7 is a table listing examples of characteristics of lenses of the converter optical system illustrated in FIG. 5.

FIG. 8 is a table listing examples of aspherical characteristics of the converter optical system illustrated in FIG. 5.

FIG. 11 is a table listing examples of characteristics of lenses of the converter optical system illustrated in FIG. 9.

FIG. 12 is a table listing examples of aspherical characteristics of the converter optical system illustrated in FIG. 9.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
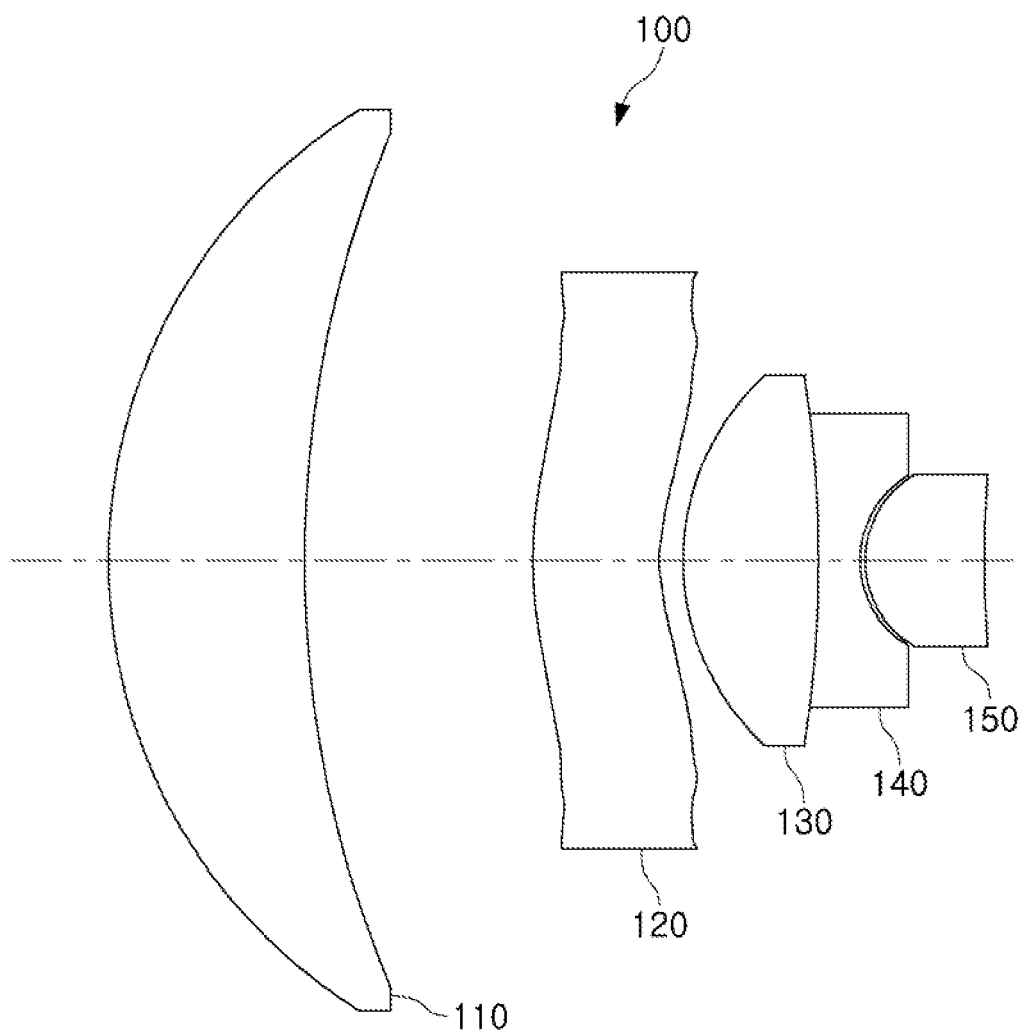
FIG. 1 is a view of a first example of a converter optical system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In this application, a first lens is a lens closest to an object (or a subject), while a fifth lens is a lens closest to an imaging plane (or an image sensor). In addition, all radii of curvature and thicknesses of lenses, D, and focal lengths are represented in millimeters (mm). Further, thicknesses of the lenses, gaps between the lenses, and D are distances on optical axes of the lenses. Further, in a description of shapes of the lenses, a statement that one surface of a lens is convex means that an optical axis portion of a corresponding surface is convex, and a statement that one surface of a lens is concave means that an optical axis portion of a corresponding surface is concave. Therefore, even if one surface of a lens is described as being convex, an edge portion of the lens may be concave. Likewise, even if one surface of a lens is described as being concave, an edge portion of the lens may be convex.

In addition, an object-side surface of each lens is a surface of the corresponding lens closest to an object, while an image-side surface of each lens is a surface of the corresponding lens closest to an imaging plane.

Next, a configuration of a converter optical system will be described.

The converter optical system includes a plurality of lenses. For example, the converter optical system may include five lenses. First to fifth lenses constituting the converter optical system are sequentially disposed in numerical order from the first lens to the fifth lens from an object side of the converter optical system to an image side of the converter optical imaging system. For example, the first lens is a lens closest to the object side, while the fifth lens is a lens closest to a portable terminal in which the converter optical system is mounted.

At least one of the first to fifth lenses may have an aspherical shape. For example, only the fifth lens of the first to fifth lenses may have an aspherical shape. In addition, at least one surface of all of the first to fifth lenses may be aspherical. An aspherical surface of each lens may be represented by the following Equation 1:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad (1)$$

In Equation 1, c is an inverse of a radius of curvature of the lens, k is a conic constant, r is a distance from a certain point on an aspherical surface of the lens to an optical axis, A to J are aspherical constants, and Z is a distance between the certain point on the aspherical surface of the lens at the distance Y and a tangential plane meeting the apex of the aspherical surface of the lens.

Next, the five lenses constituting the converter optical system will be described in detail.

The first lens has refractive power. For example, the first lens may have positive refractive power.

At least one surface of the first lens may be convex. For example, an object-side surface of the first lens may be convex.

The first lens may have a spherical surface. For example, both surfaces of the first lens may be spherical. The first lens may be formed of a material having high light transmissivity and excellent workability. For example, the first lens may be formed of plastic. However, a material of the first lens is not limited to plastic. For example, the first lens may be formed of glass.

The second lens has refractive power. For example, the second lens may have negative refractive power.

The second lens may have a meniscus shape. For example, an object-side surface of the second lens may be convex, and an image-side surface of the second lens may be concave.

The second lens may have an aspherical surface. For example, an object-side surface and the image-side surface of the second lens may be aspherical. The second lens may be formed of a material having high light transmissivity and excellent workability. For example, the second lens may be formed of plastic. However, a material of the second lens is not limited to plastic. For example, the second lens may also be formed of glass.

The second lens may be formed of a material having a high refractive index. For example, a refractive index of the second lens may be 1.60 or more. The second lens may have a low Abbe number. For example, an Abbe number of the second lens may be 30 or less. The second lens configured as described above improves chromatic aberration produced by the first lens.

The third lens has refractive power. For example, the third lens may have positive refractive power.

At least one surface of the third lens may be convex. For example, both surfaces of the third lens may be convex.

The third lens may have a spherical surface. For example, both surfaces of the third lens may be spherical. The third lens may be formed of a material having high light transmissivity and excellent workability. For example, the third lens may be formed of plastic. However, a material of the third lens is not limited to plastic. For example, the third lens may be formed of glass.

The third lens may be formed of a material having a high refractive index. For example, a refractive index of the third lens may be 1.60 or more. The third lens may have a low Abbe number. For example, an Abbe number of the third lens may be 32 or less.

The fourth lens has refractive power. For example, the fourth lens may have negative refractive power.

The fourth lens may have a biconcave shape. For example, both surfaces of the fourth lens may be concave.

The fourth lens may have a spherical surface. For example, both surfaces of the fourth lens may be spherical. The fourth lens may be formed of a material having high light transmissivity and excellent workability. For example, the fourth lens may be formed of plastic. However, a material of the fourth lens is not limited to plastic. For example, the fourth lens may be formed of glass.

The fourth lens may be formed of a material having a high refractive index. For example, a refractive index of the fourth lens may be 1.90 or more. The fourth lens may have a low Abbe number. For example, an Abbe number of the fourth lens may be 30 or less.

The fourth lens may be bonded to either one or both of the third lens and the fifth lens. For example, an object-side surface of the fourth lens may be bonded to an image-side surface of the third lens, or an image-side surface of the fourth lens may be bonded to an object-side surface of the fifth lens, or both the object-side surface of the fourth lens may be bonded to the image-side surface of the third lens and the image-side surface of the fourth lens may be bonded to the object-side surface of the fifth lens.

The fifth lens has refractive power. For example, the fifth lens may have positive refractive power.

At least one surface of the fifth lens may be convex. For example, the object-side surface of the fifth lens may be convex.

The fifth lens may have a spherical surface or an aspherical surface. For example, both surfaces of the fifth lens may be spherical or aspherical. The fifth lens may be formed of a material having high light transmissivity and excellent workability. For example, the fifth lens may be formed of plastic. However, a material of the fifth lens is not limited to plastic. For example, the fifth lens may be formed of glass.

The converter optical system may satisfy the following Conditional Expressions:

$$26 < D < 45 \text{ mm}$$

$$1.55 < n1 < 1.65$$

$$f\text{-number} < 2.0$$

$$1000 \le f/D$$

In the above Conditional Expressions, D is a distance from the object-side surface of the first lens to the image-side surface of the fifth lens, n1 is a refractive index of the first lens, f-number is an f-number of the converter optical system, and f is an overall focal length of the converter optical system.

A converter optical system satisfying the above Conditional Expressions may be miniaturized. In addition, a converter optical system satisfying the above Conditional Expressions may clearly image a subject positioned at a long distance.

Next, converter optical systems according to several examples will be described.

First, a converter optical system according to a first example will be described with reference to FIG. 1.

The converter optical system 100 according to the first example includes a plurality of lenses having refractive power. For example, the converter optical system 100 includes a first lens 110, a second lens 120, a third lens 130, a fourth lens 140, and a fifth lens 150.

In the first example, the first lens 110 has positive refractive power, and an object-side surface thereof is convex and an image-side surface thereof is concave. The second lens 120 has negative refractive power, and an object-side surface thereof is convex and an image-side surface thereof is concave. The third lens 130 has positive refractive power, and both an object-side surface and an image-side surface thereof are convex. The fourth lens 140 has negative refractive power, and both an object-side surface and an image-side surface thereof are concave. The fifth lens 150 has positive refractive power, and an object-side surface thereof is convex and an image-side surface thereof is concave.

Absolute values of effective radii of the first to fifth lenses 110 to 150 decrease as a distance of a lens from an object side of the converter optical system 100 increases. For example, in the converter optical system 100, the absolute value of the effective radius of the first lens 110 is the largest, and the absolute value of the effective radius of the fifth lens 150 is the smallest. That is, a conditional expression |r1|>|r2|>|r3|>|r4|>|r5| is satisfied, where r1 is the effective radius of the first lens 110, r2 is the effective radius of the second lens 120, r3 is the effective radius of the third lens 130, r4 is the effective radius of the fourth lens 140, and r5 is the effective radius of the fifth lens 150.

The fourth lens 140 is bonded to a lens adjacent thereto. For example, the object-side surface of the fourth lens 140 is bonded to the image-side surface of the third lens 130. Bonded portions of the lenses may be limited to optical axis centers of the lenses. For example, an edge of the object-side surface of the fourth lens 140 and an edge of the image-side surface of the third lens 130 may not be completely bonded to each other.

Figure 2:
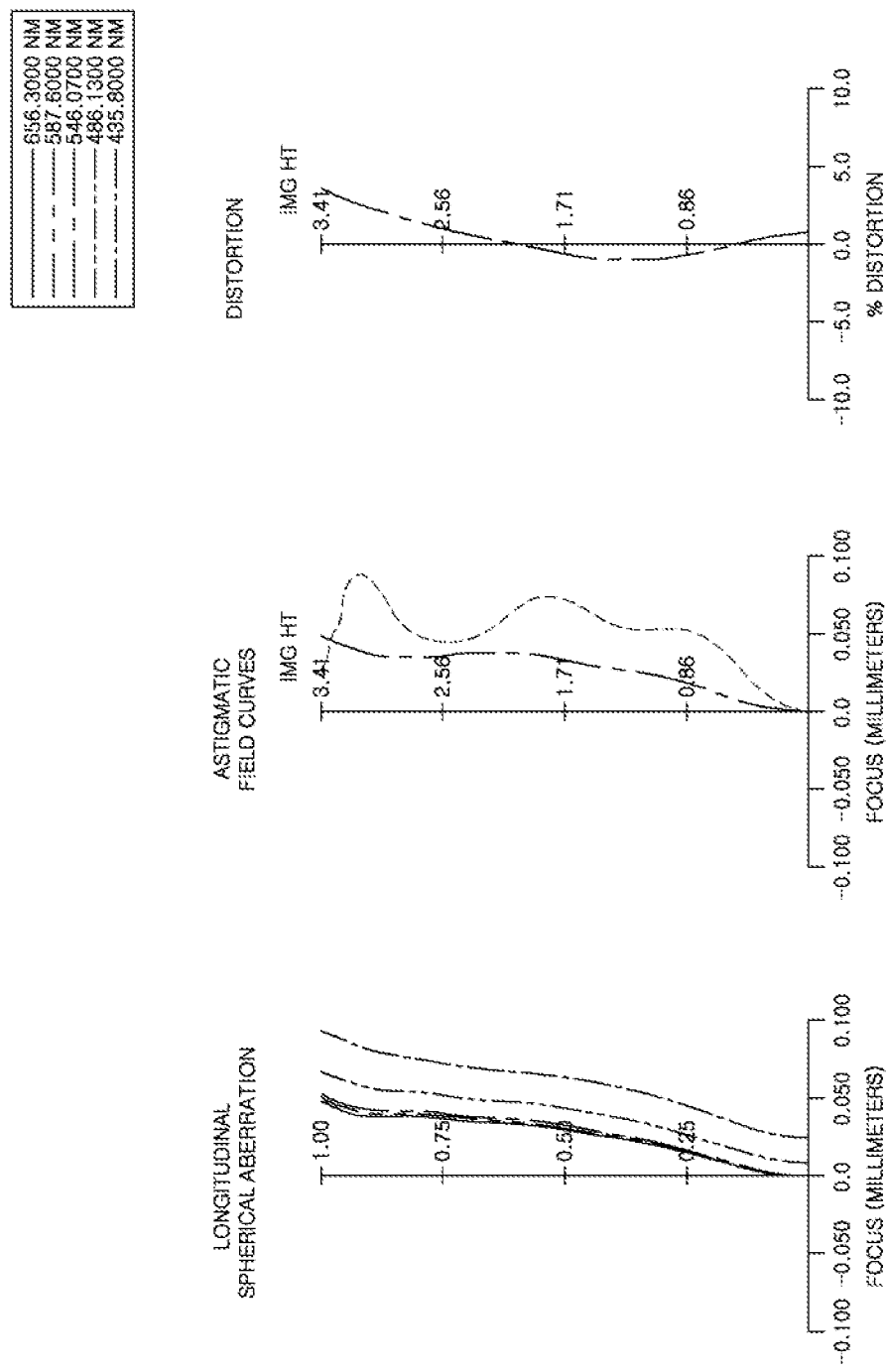
FIG. 2 illustrates examples of aberration curves of the converter optical system illustrated in FIG. 1.

FIG. 2 illustrates examples of aberration characteristics of the converter optical system 100 illustrated in FIG. 1. FIG. 3 is a table listing examples of characteristics of lenses of the converter optical system 100 illustrated in FIG. 1. FIG. 4 is a table listing examples of aspherical characteristics of the converter optical system 100 illustrated in FIG. 1.

A converter optical system according to a second example will be described with reference to FIG. 5.

The converter optical system 200 according to the second example includes a plurality of lenses having refractive power. For example, the converter optical system 200 includes a first lens 210, a second lens 220, a third lens 230, a fourth lens 240, and a fifth lens 250.

In the second example, the first lens 210 has positive refractive power, and an object-side surface thereof is convex and an image-side surface thereof is concave. The second lens 220 has negative refractive power, and an object-side surface thereof is convex and an image-side surface thereof is concave. The third lens 230 has positive refractive power, and both an object-side surface and an image-side surface thereof are convex. The fourth lens 240 has negative refractive power, and both an object-side surface and an image-side surface thereof are concave. The fifth lens 250 has positive refractive power, and both an object-side surface an image-side surface thereof are convex.

Absolute values of effective radii of the first to fifth lenses 210 to 250 decrease as a distance of a lens from the object side of the converter optical system 200 increases. For example, in the converter optical system 200, the absolute value of the effective radius of the first lens 210 is the largest, and the absolute value of the effective radius of the fifth lens 250 is the smallest. That is, the conditional expression |r1|>|r2|>|r3|>|r4|>|r5| is satisfied, where r1 is the effective radius of the first lens 210, r2 is the effective radius of the second lens 220, r3 is the effective radius of the third lens 230, r4 is the effective radius of the fourth lens 240, and r5 is the effective radius of the fifth lens 250.

The fourth lens 240 is bonded to a lens adjacent thereto. For example, the object-side surface of the fourth lens 240 is bonded to the image-side surface of the third lens 230. Bonded portions of the lenses may be limited to optical axis centers of the lenses. For example, an edge of the object-side surface of the fourth lens 240 and an edge of the image-side surface of the third lens 230 may not be completely bonded to each other.

Figure 5:
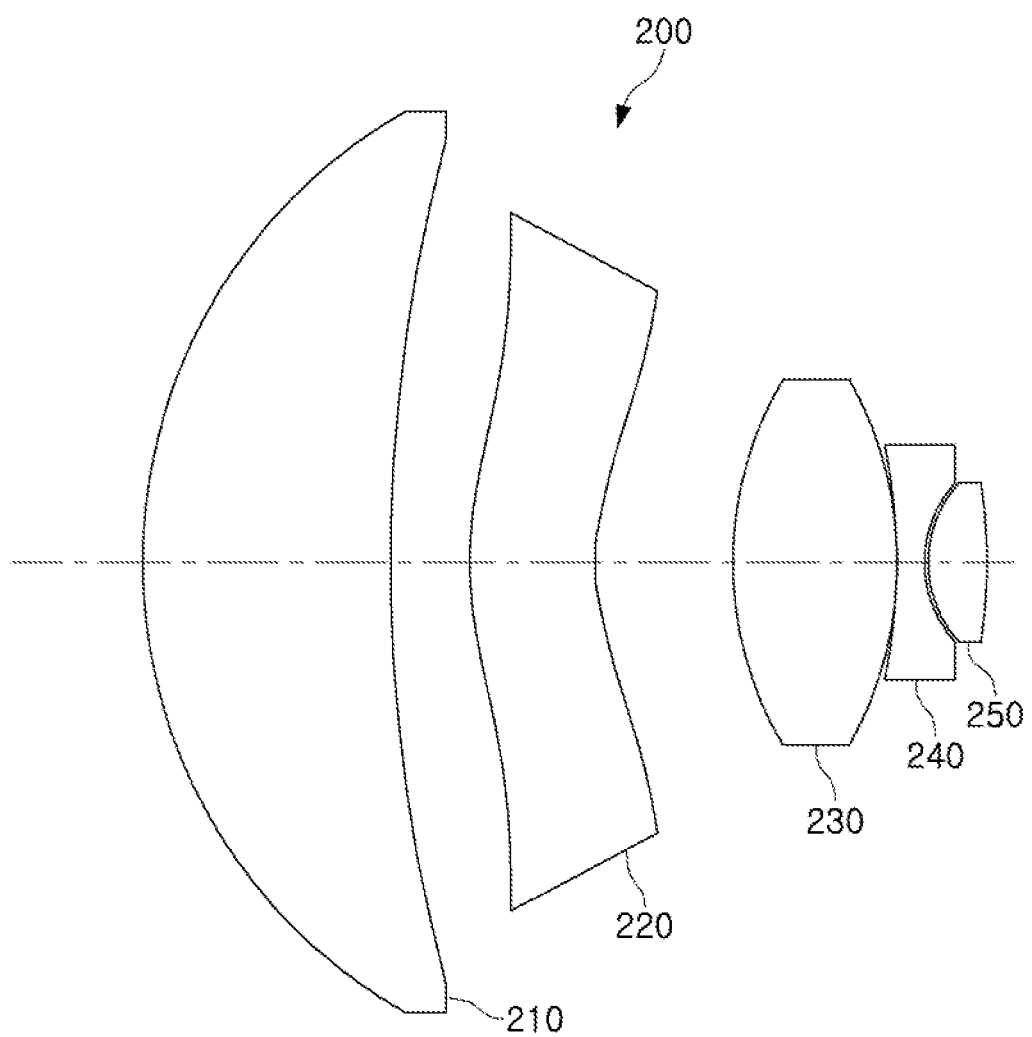
FIG. 5 is a view of a second example of a converter optical system.
Figure 6:
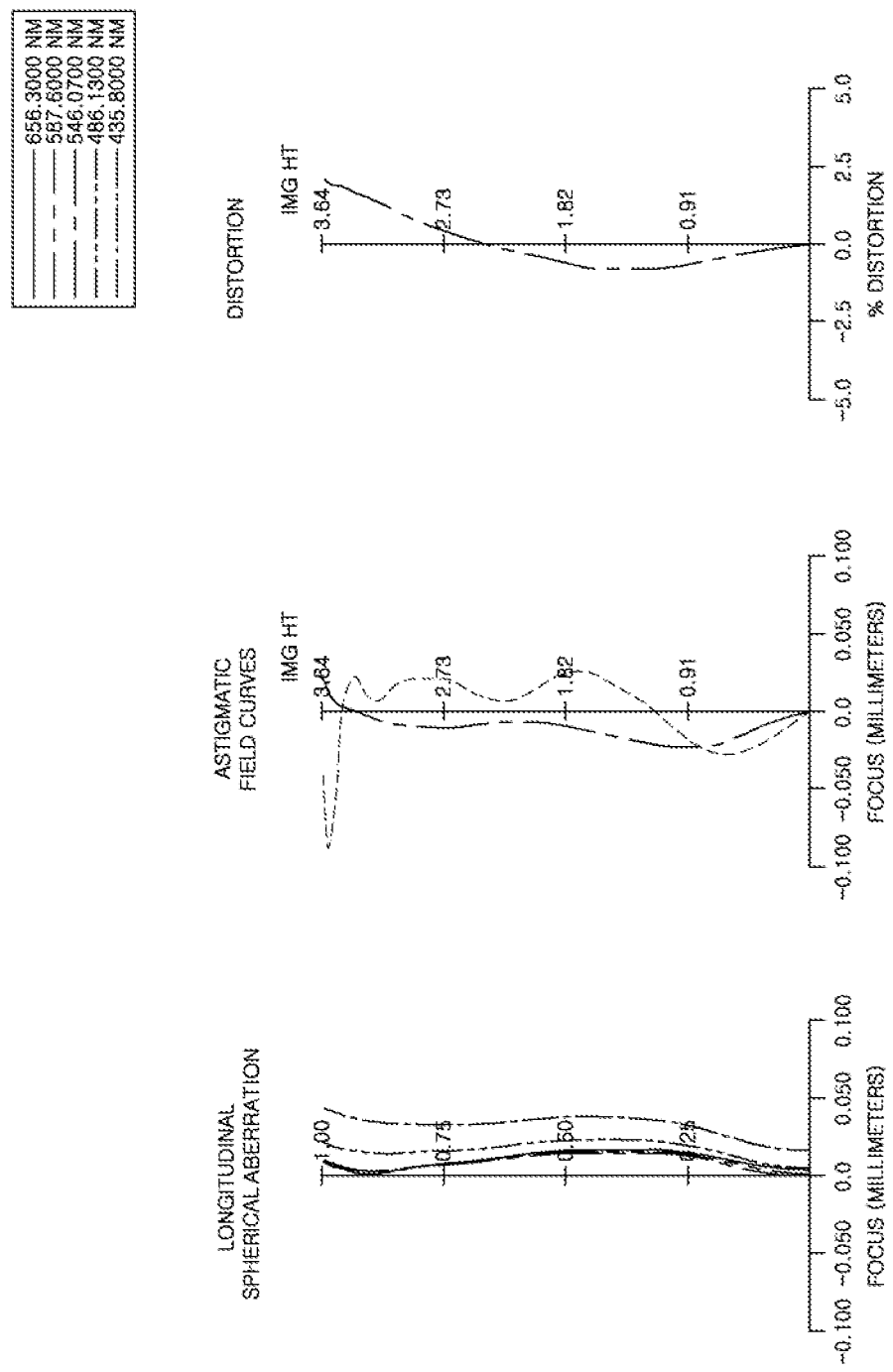
FIG. 6 illustrates examples of aberration curves of the converter optical system illustrated in FIG. 5.

FIG. 6 illustrates examples of aberration characteristics of the converter optical system 200 illustrated in FIG. 5. FIG. 7 is a table listing examples of characteristics of lenses of the converter optical system 200 illustrated in FIG. 5. FIG. 8 is a table listing examples of aspherical characteristics of the converter optical system 200 illustrated in FIG. 5.

A converter optical system according to a third example will be described with reference to FIG. 9.

The converter optical system 300 according to the third example includes a plurality of lenses having refractive power. For example, the converter optical system 300 includes a first lens 310, a second lens 320, a third lens 330, a fourth lens 340, and a fifth lens 350.

In the third example, the first lens 310 has positive refractive power, and an object-side surface thereof is convex and an image-side surface thereof is concave. The second lens 320 has negative refractive power, and an object-side surface thereof is convex and an image-side surface thereof is concave. The third lens 330 has positive refractive power, and both an object-side surface and an image-side surface thereof are convex. The fourth lens 340 has negative refractive power, and both an object-side surface and an image-side surface thereof are concave. The fifth lens 350 has positive refractive power, and both an object-side surface and an image-side surface thereof are convex.

Absolute values of effective radii of the first to fifth lenses 310 to 350 decrease as a distance of a lens from the object side of the converter optical system 300 increases. For example, in the converter optical system 300, the absolute value of the effective radius of the first lens 310 is the largest, and the absolute value of the effective radius of the fifth lens 350 is the smallest. That is, the conditional expression |r1|>|r2|>|r3|>|r4|>|r5| is satisfied, where r1 is the effective radius of the first lens 310, r2 is the effective radius of the second lens 320, r3 is the effective radius of the third lens 330, r4 is the effective radius of the fourth lens 340, and r5 is the effective radius of the fifth lens 350.

The fourth lens 340 is bonded to a lens adjacent thereto. For example, the object-side surface of the fourth lens 340 is bonded to the image-side surface of the third lens 330. Bonded portions of the lenses may be limited to optical axis centers of the lenses. For example, an edge of the object-side surface of the fourth lens 340 and an edge of the image-side surface of the third lens 330 may not be completely bonded to each other.

Figure 9:
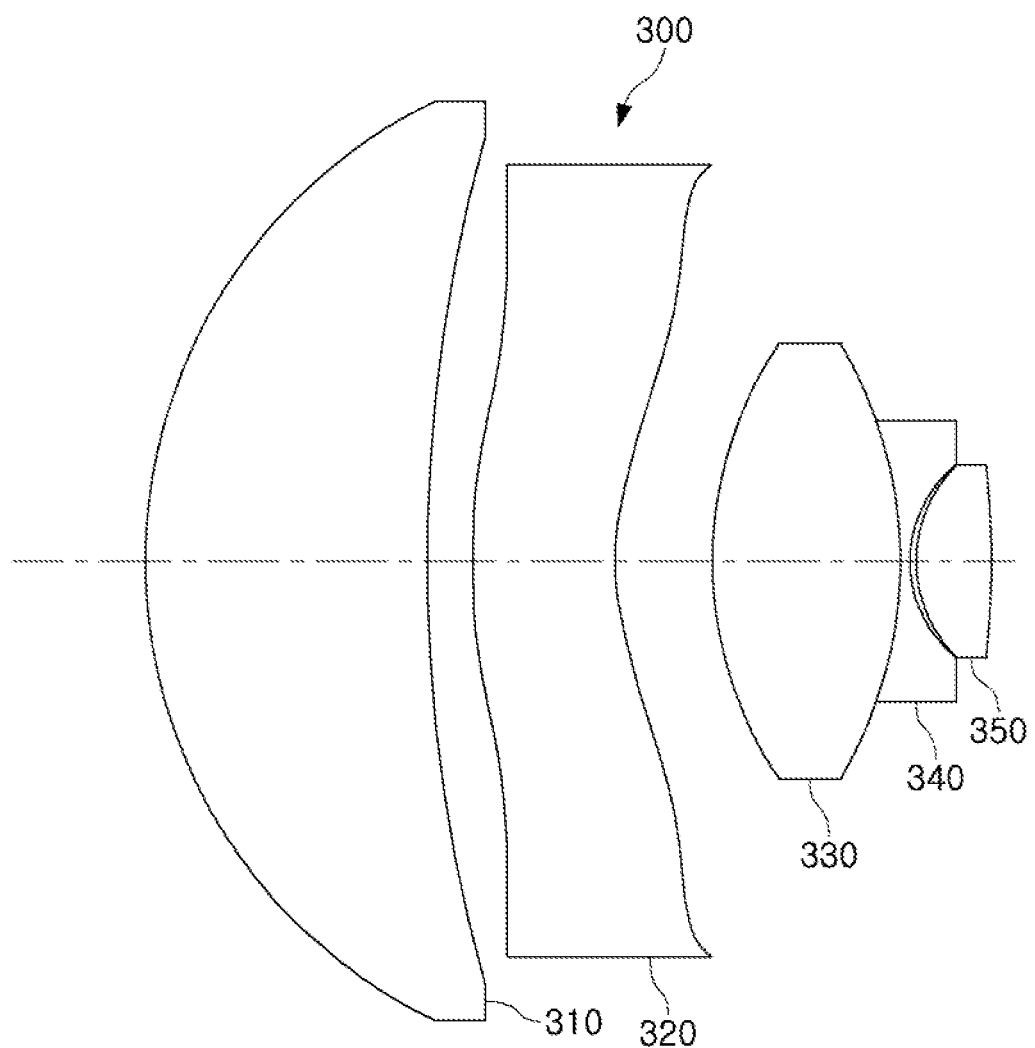
FIG. 9 is a view of a third example of a converter optical system.
Figure 10:
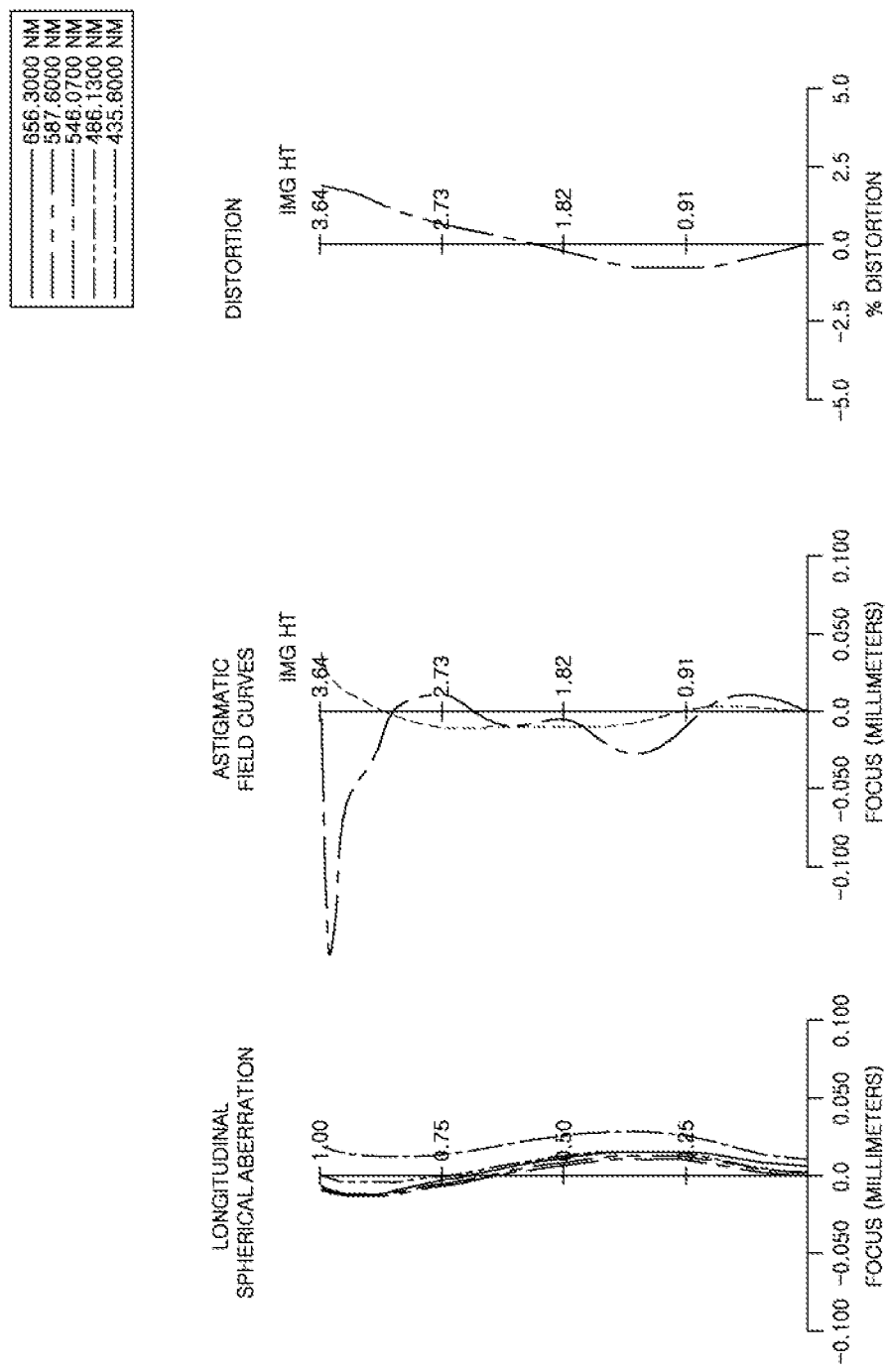
FIG. 10 illustrates examples of aberration curves of the converter optical system illustrated in FIG. 9.

FIG. 10 illustrates examples of aberration characteristics of the converter optical system 300 illustrated in FIG. 9. FIG. 11 is a table listing examples of characteristics of lenses of the converter optical system 300 illustrated in FIG. 9. FIG. 12 is a table listing examples of aspherical characteristics of the converter optical system 300 illustrated in FIG. 9.

Table 1 below lists optical characteristics and values of Conditional Expressions of the converter optical systems 100, 200, and 300 according to the first, second, and third examples. An overall focal length (f) of the converter optical system is substantially determined to be 40000 or more. In the converter optical system, a focal length (f1) of the first lens is substantially determined to be in a range of 35.0 to 72.0. In the converter optical system, a focal length (f2) of the second lens is substantially determined to be in a range of −34.0 to −64.0. In the converter optical system, a focal length (f3) of the third lens is substantially determined to be in a range of 8.0 to 17. In the converter optical system, a focal length (f4) of the fourth lens is substantially determined to be in a range of −6.0 to −2.0. In the converter optical system, a focal length (f5) of the fifth lens is substantially determined to be in a range of 5.0 to 10. In the converter optical system, a distance (D) from the object-side surface of the first lens to the image-side surface of the fifth lens is substantially determined to be in a range of 26 to 45.

TABLE 1

| Characteristic | First Example | Second Example | Third Example |
| --- | --- | --- | --- |
| f | 48328.0 | 47047.3 | 47120.4 |
| f1 | 69.8771 | 44.3692 | 36.7307 |
| f2 | −62.6374 | −44.0214 | −35.7526 |
| f3 | 15.9998 | 9.8516 | 9.5286 |
| f4 | −4.4239 | −3.2493 | −3.0349 |
| f5 | 8.4396 | 7.5096 | 6.5519 |
| D | 40.00 | 30.91 | 26.97 |
| n1 | 1.5891 | 1.5891 | 1.5891 |
| f-number | 1.95 | 1.93 | 1.94 |
| f/D | 1208.2 | 1522.1 | 1747.1 |

Figure 13:
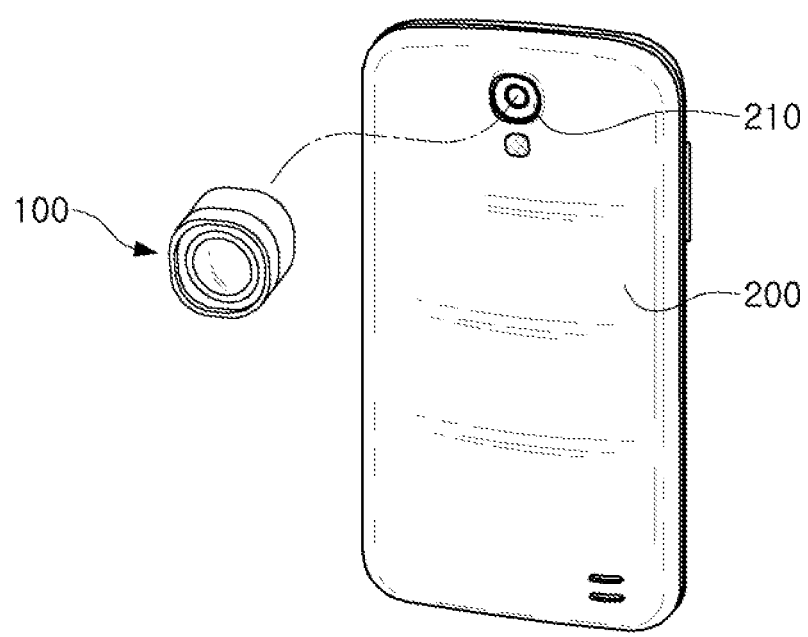
FIG. 13 is a rear perspective view of an example of a portable terminal in which an example of a converter optical system described in this application is mounted.

FIG. 13 is a rear perspective view of an example of a portable terminal in which an example of a converter optical system described in this application is mounted.

The converter optical system 100 described above is mounted in a portable terminal 200. For example, the converter optical system 100 is coupled to a camera module 210 embedded in a front surface or a rear surface of the portable terminal 200.

The converter optical system 100 increases a magnification of the camera module 210. For example, the converter optical system 100 increases a focal length of the camera module 210 by two times or more. That is, the converter optical system 100 provides a telephoto lens function, i.e., the converter optical system 100 is a teleconverter optical system. Therefore, when the converter optical system 100 is used, a subject positioned at a long distance may be clearly imaged.

Although the example in FIG. 13 shows the converter optical system 100 described above being mounted in the portable terminal 200, this is merely an example, and either the converter optical system 200 or the converter optical system 300 described above, or another converter optical system satisfying the Conditional Expressions described above, may be mounted in the portable terminal 200.

According to the examples described above, a converter optical system providing a telephoto lens function may be provided.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A converter optical system comprising:
   a first lens having positive refractive power and a concave image-side surface;
   a second lens having negative refractive power;
   a third lens having positive refractive power;
   a fourth lens having a refractive power and a concave image-side surface; and
   a fifth lens having a convex object-side surface,
   wherein the first to fifth lenses are sequentially disposed in numerical order from the first lens to the fifth lens from an object side of the converter optical system to an image side of the converter optical system,
   a thickness of the first lens is greater than a thickness of the fifth lens,
   the first to fifth lenses are the only lenses that have refractive power in the converter optical system,
   f-number <2.0, where f-number is an f-number of the converter optical system,
   a radius of curvature of an object-side surface of the first lens is greater than a radius of curvature of an object-side surface of the second lens, and
   1000<f/D, where f is an overall focal length of the converter optical system and D is a distance from an object-side surface of the first lens to an image-side surface of the fifth lens.

2. The converter optical system of claim 1, wherein the first lens has a convex object-side surface.

3. The converter optical system of claim 1, wherein the second lens has a convex object-side surface.

4. The converter optical system of claim 1, wherein the second lens has a concave image-side surface.

5. The converter optical system of claim 1, wherein the third lens has a convex object-side surface.

6. The converter optical system of claim 1, wherein the fourth lens has a concave object-side surface.

7. The converter optical system of claim 1, wherein the fifth lens has a concave image-side surface.

8. The converter optical system of claim 1, wherein the second lens has a refractive index of 1.6 or more.

9. The converter optical system of claim 1, wherein the second lens has an Abbe number of 30 or less.

10. The converter optical system of claim 1, wherein third lens has a focal length ranging from 8.0 mm to 17 mm.

11. The converter optical system of claim 1, wherein the fourth lens has negative refractive power.

12. The converter optical system of claim 1, wherein the fifth lens has positive refractive power.

13. The converter optical system of claim 1, wherein $|r1|>|r2|>|r3|>|r4|>|r5|$, where r1 is an effective radius of the first lens, r2 is an effective radius of the second lens, r3 is an effective radius of the third lens, r4 is an effective radius of the fourth lens, and r5 is an effective radius of the fifth lens.

14. A converter optical system comprising:
   a first lens having positive refractive power;
   a second lens having negative refractive power;
   a third lens having positive refractive power;
   a fourth lens having a refractive power and a concave image-side surface; and
   a fifth lens having a convex object-side surface,
   wherein the first to fifth lenses are sequentially disposed in numerical order from the first lens to the fifth lens from an object side of the converter optical system to an image side of the converter optical system,
   a thickness of the first lens is greater than a thickness of the fifth lens,
   the first to fifth lenses are the only lenses that have refractive power in the converter optical system,
   f-number <2.0, where f-number is an f-number of the converter optical system, and
   1000<f/D, where f is an overall focal length of the converter optical system and D is a distance from an object-side surface of the first lens to an image-side surface of the fifth lens.

15. A converter optical system comprising:
   a first lens having positive refractive power;
   a second lens having negative refractive power;
   a third lens having positive refractive power;
   a fourth lens having a refractive power and a concave image-side surface; and
   a fifth lens having a convex object-side surface,
   wherein the first to fifth lenses are sequentially disposed in numerical order from the first lens to the fifth lens from an object side of the converter optical system to an image side of the converter optical system,
   a thickness of the first lens is greater than a thickness of the fifth lens,
   the first to fifth lenses are the only lenses that have refractive power in the converter optical system,
   f-number <2.0, where f-number is an f-number of the converter optical system, and
   $[r1|>|r2|>|r3|>|r4|>|r5]$, where r1 is an effective radius of the first lens, r2 is an effective radius of the second lens, r3 is an effective radius of the third lens, r4 is an effective radius of the fourth lens, and r5 is an effective radius of the fifth lens.

* * * * *